United States Patent
Lazarov et al.

(10) Patent No.: US 12,149,119 B1
(45) Date of Patent: *Nov. 19, 2024

(54) BATTERY SYSTEM WITH INTEGRATED CELL RECOVERY

(71) Applicant: Brunswick Corporation, Mettawa, IL (US)

(72) Inventors: Aleksandar Lazarov, Rotterdam (NL); Ron Hogedoorn, Bodegraven (NL)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,758

(22) Filed: Nov. 6, 2023

Related U.S. Application Data

(63) Continuation of application No. 17/855,977, filed on Jul. 1, 2022, now Pat. No. 11,817,739.

(60) Provisional application No. 63/217,915, filed on Jul. 2, 2021.

(51) Int. Cl.
*H02J 9/06* (2006.01)
*H02J 7/00* (2006.01)

(52) U.S. Cl.
CPC ............ *H02J 9/068* (2020.01); *H02J 7/0013* (2013.01); *H02J 7/00308* (2020.01); *H02J 7/0042* (2013.01); *H02J 7/0047* (2013.01); *H02J 7/007194* (2020.01)

(58) Field of Classification Search
CPC .. H02J 9/068; H02J 7/00308; H02J 7/007194; H02J 7/0013; H02J 7/0042; H02J 7/0047
See application file for complete search history.

(56) References Cited

U.S. PATENT DOCUMENTS

| | | | |
|---|---|---|---|
| 9,325,177 B2 | 4/2016 | Van Zwam et al. | |
| 11,817,739 B1 * | 11/2023 | Lazarov | .......... H02J 9/068 |
| 2010/0085012 A1 | 4/2010 | Cruise et al. | |

* cited by examiner

*Primary Examiner* — Carlos Amaya
(74) *Attorney, Agent, or Firm* — Andrus Intellectual Property Law, LLP

(57) ABSTRACT

A rechargeable lithium-ion battery system includes a cell pack comprising a plurality of battery cells, a charger connection configured to connect to an external battery charger to supply a first charge current to recharge the plurality of battery cells, and a safety switch positioned between the cell pack and the charger connection and operable to divert the first charge current from the external battery charger through a cell recovery charger to the cell pack. The system is configured to operate the cell recovery charger to deliver a charge current to the cell pack to charge the plurality of battery cells until a cell voltage of each of the plurality of battery cells is greater than a threshold cell voltage or until a time out period is reached.

20 Claims, 6 Drawing Sheets

BATTERY SYSTEM WITH INTEGRATED CELL RECOVERY

CROSS-REFERENCE TO RELATED APPLICATION

This application is a continuation of U.S. patent application Ser. No. 17/855,977, filed Jul. 1, 2022, which claims priority to U.S. Provisional Patent Application No. 63/217,915, filed Jul. 2, 2021, all of which applications are incorporated herein by reference in their entirety.

FIELD

The present disclosure relates to rechargeable systems and more particularly to methods and systems for controlling a charging of a rechargeable lithium-ion batteries.

BACKGROUND

Rechargeable lithium-ion batteries are available for storing large amounts of energy for powering vehicle loads, including land vehicles and marine vessel loads, such as configured to power electric marine propulsion devices. Lithium-ion (li-ion) battery packs have high energy densities and are configured to deliver energy at high currents and voltages. The energy is often stored in a plurality of smaller storage elements, such as battery cells or groups of battery cells, housed and electrically connected together in series to generate a high-voltage output. Lithium-ion batteries generally have external housings, or enclosures, configured to protect the battery cells and prevent water ingress, to safely contain the high voltage storage elements, and to provide connections to charging and discharging the battery cells. The lithium-ion battery is connectable to an external charger, such as an external charger configured to draw grid power, that delivers a charge current to recharge the plurality of battery cells.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a rechargeable lithium-ion battery system includes a cell pack comprising a plurality of battery cells, a charger connection configured to connect to a battery charger to supply a charge current to recharge the plurality of battery cells, and a safety switch positioned between the cell pack and the charger connection and operable to divert charge current from the battery charger through a cell recovery charger to the cell pack. The cell recovery charger is configured to deliver a reduced charge current to the cell pack that is less than the charge current supplied by the charger.

One embodiment of a method for controlling charging of a rechargeable lithium-ion battery system is provided, wherein the rechargeable lithium-ion battery system includes a cell recovery charger and safety switch positioned between a cell pack and a charger connection to an external battery charger supplying a first charge current to recharge the plurality of battery cells. The method includes monitoring a cell voltage of a plurality of battery cells in the cell pack, upon detecting that the cell voltage of any one of the plurality of battery cells in the cell pack is less than a first threshold cell voltage, operating the safety switch to prevent direct delivery of the first charge current to the cell pack and to divert the first charge current to the cell recovery charger. The cell recovery charger is operated to deliver a reduced charge current to the cell pack and to a battery management system (BMS) of the rechargeable lithium-ion battery system until the cell voltage of each of the plurality of battery cells is greater than the first threshold cell voltage or a time out period is reached, wherein the reduced charge current is less than the first charge current supplied by the external battery charger.

Various other features, objects, and advantages of the invention will be made apparent from the following description taken together with the drawings.

DETAILED DESCRIPTION

Figure 1:
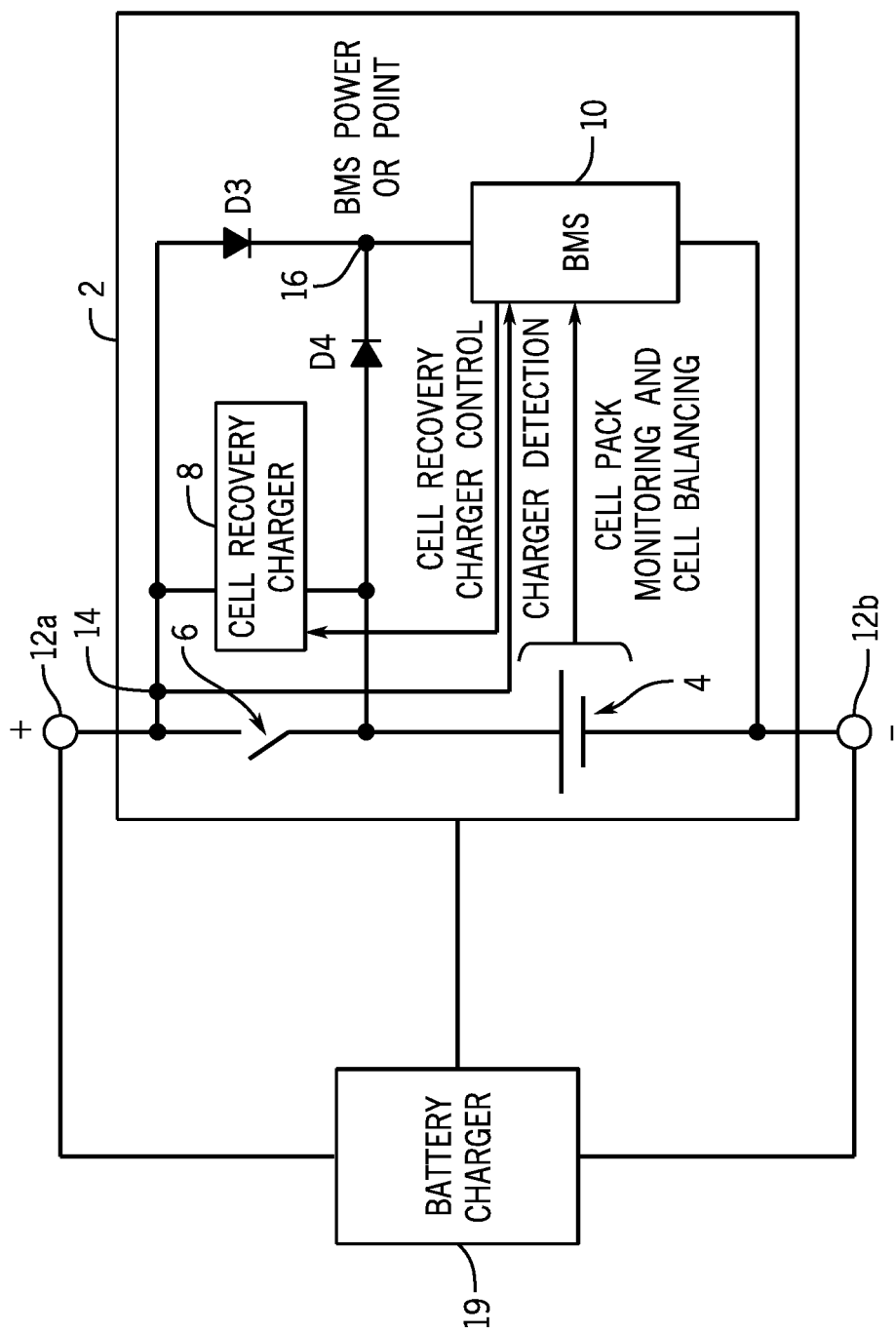
FIG. 1 is a schematic diagram of a rechargeable lithium-ion (LI) battery system according to one embodiment of the present disclosure.

The present inventors have recognized that current systems and methods for dealing with deeply discharged lithium-ion (LI) batteries are inefficient. If an LI battery is very deeply discharged (e.g., voltage <1.5V per cell) the battery management system will act to protect the cells and disconnect the main safety switch to prevent (further) damage of the lithium-ion cells. Subsequently the systems voltage (e.g., 4 cells×1.5V for a 12V battery=6V) might also be too low to drive auxiliary power supplies causing the battery's control system to stop working. A battery can end up in a deeply discharge state in multiple ways, sometimes even during normal use. All physical cells have some amount of self-discharge current, i.e., the cells inherently discharge themselves. Additionally, many battery systems contain internally-powered elements that add an additional load, such as the battery control system (often referred to as the battery management system (BMS)). In the event that the battery is not charged on a regular basis and left inactive for a prolonged period, the cells will ultimately get deeply discharged.

With currently available LI battery systems, if deep discharge occurs the battery needs to be returned to a service point/manufacturer to evaluate the state of the cells, execute a recovery procedure for the cells and get the BMS re-booted. This requires involvement of a skilled technician who can execute a safe recharge and testing procedure to make sure that the LI battery cells have not been irreparably damaged and can be safely recharged and operated. During the re-booting and testing process the battery cannot be charged with the normal charge current applied by a normal battery charging system because application of the normal current levels to deeply discharged battery cells could result in destruction of the battery cells, thermal runaway, or other undesirable events. The charge current delivered to deeply discharged battery cells needs to be reduced, such as to a 0.05C value or even lower.

The present inventors have recognized that revitalization of a deeply discharged LI battery is a delicate process that must account for several factors throughout the recovery process, including battery cell voltage, temperature, cell behavior during charge and under load, and the like. However, the inventors have also recognized that current procedures requiring a user to bring a battery to a service center and involvement of a trained technician to evaluate and/or revitalize the battery is cumbersome, burdensome, and wasteful of both user and service provider resources. Further, the inventors have recognized that current procedures rely on technician judgement and discretion in determining whether an LI battery is recoverable. For example, technicians typically rely on battery voltage tests, where the entire battery voltage is measured with a volt meter, to determine whether the LI battery is compromised and thus not recoverable.

In view of the forgoing problems and challenges in the relevant field, the inventors developed the disclosed LI battery system with an integrated cell recovery system and method that automatically detects that a deep discharge has occurred and can autonomously execute a recovery process to charge and test the deeply discharged LI cell pack. The disclosed LI battery system includes an integrated cell recovery charger and a control system, referred to herein as the battery management system (BMS), configured to safely charge and perform self-diagnostics on the cell pack during the recovery process. The cell recovery charger is configured to deliver a reduced charge current that is less than the normal charge current provided by a standard battery charger used to charge the LI battery system.

To enable the recovery process management, the BMS is configured to be powered by either of both the battery charger connected to the LI battery system and by the cell pack within the LI battery system. During normal operation of a typical LI battery, the BMS is powered by the cell pack. If the battery cells in the cell pack are deeply discharged, then they cannot power the BMS. In currently available battery systems, the BMS is disconnected from the cell pack once the stored voltage reaches a low threshold and rebooting the BMS requires technician intervention to reconnect power and restart the BMS. This is problematic and means that technician intervention is required for recovery of current LI battery systems. The disclosed system overcomes that problem by configuring the BMS to be powered by the charge current from a standard battery charger when the cell pack voltage is insufficient to power the BMS. Thus, the BMS is powered upon connection of a battery charger to the deeply discharged LI battery system and is configured to then execute a prescribed recovery process, as described herein.

Deep discharge is detected based on the battery cell voltages, such as whether any cell voltage reaches a predetermined low voltage limit (e.g., 1.5 V). Deep discharge may be detected and a recovery process triggered based on data stored, such as in EEPROM, by the BMS before switching off, or based on voltage measurements made upon powering on the BMS (such as upon being powered by a battery charger connected to the LI battery system).

When a user tries to bring back the battery from a deeply discharge state, such as by connecting the LI battery system to a standard battery charger, the BMS and the cell recovery charger execute a recovery algorithm to safely bring the cell voltages to the safe operating area (SOA) prescribed for the particular LI battery cells, test for capacity retention, temperature, etc., and based on the test determine whether the battery cells can or cannot be charged normally. The BMS is configured to pre-charge the pack with a reduced charge current delivered by the cell recovery charger for a certain amount of time in order to assess the state of the cells, then switch off for charge retention testing. The reduced charge current is a very low current level, which may be calibrated for a specific cell capacity. To provide one example, for an LI battery system comprising 50 amp hour (A h) cells, the reduced charge current may be 1 amp (A).

If an abnormality is detected by the BMS during the recovery procedure, such as measured cell voltages outside of an acceptable range, then the battery is determined to be compromised. If the BMS determines that the LI battery system is compromised, charge from the cell recovery charger is stopped, the recovery process is aborted, and an alert is generated accordingly. If an abnormality is not detected during the recovery process and all cells have reached and maintained the SOA utilizing the prescribed recovery process, then the standard battery charger is electrically connected to the cell pack by closing the safety switch to deliver the normal charge current. Thereby the battery has been "recovered" and the cell pack is enabled to be fully recharged according to the normal charging mechanisms and procedures for LI battery systems.

Figure 2:
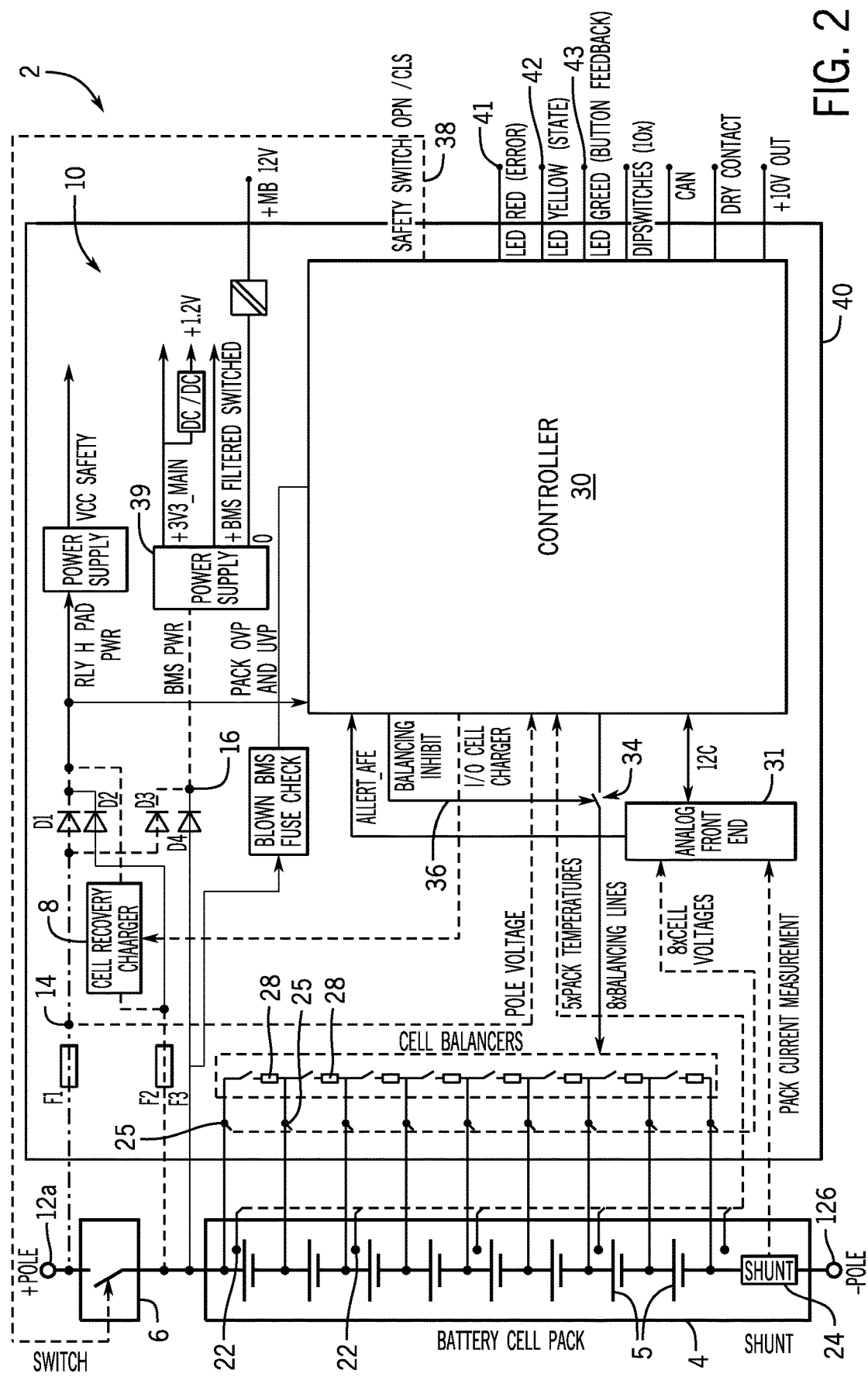
FIG. 2 is a schematic diagram of an LI battery system according to another embodiment of the present disclosure.

FIGS. 1 and 2 depict exemplary embodiments of an LI battery system 2. The rechargeable LI battery system includes a battery cell pack 4 comprising a plurality of battery cells 5. The cell pack 4 may be, for example, a 12V, 24V, 36V, or 48V lithium-ion cell pack. The cell pack 4 may be comprised of any number of two or more battery cells 5, such as eight battery cells as shown in the example at FIG. 2, which may be, for example, 50 of amp hour (A h) cells or cells of a larger or smaller capacity than that. In other embodiments, the cell pack 4 may include four battery cells 5, and in still other embodiments the cell pack 4 may include fourteen or sixteen cells 5. The battery cells 5 may be lithium iron phosphate cells or another type of lithium-ion chemical composition.

The rechargeable LI battery system 2 is connected to a battery charger 19, which is a standard battery charger configured to charge the LI battery system 2, such as based on the capacity and chemistry thereof. The LI battery system 2 includes a charger connection 12 (12a and 12b) configured to connect to the battery charger 19 to receive charge current therefrom, which includes a positive connection point 12a and a negative connection point 12b. The charger connection 12 may be of any configuration. To provide just one example, the charger connection 12a, 12b is two metal posts or bolts to which the battery charger 19 (or a load) can connect by clamping or otherwise attaching.

The LI battery system 2 includes a battery management system (BMS) 10 configured to monitor the cell pack 4 and control cell balancing, for example, as well as to control the cell recovery process as described herein. The BMS 10 is thus configured to control the cell recovery charger 8. The cell recovery charger 8 is configured to deliver a reduced charge current to the cell pack 4 when the safety switch 6 is in the open position, as illustrated in FIGS. 1 and 2.

The safety switch 6 is positioned between the cell pack 4 and the charger connection 12a and configured such that, when in the open position, it prevents delivery of the charger current from the battery charger 19 to the cell pack 4. The safety switch 6 is controllable, such as by the BMS 10, to open when a fault condition is detected, such as a deep discharge or other very low voltage state, detection of a temperature outside of a threshold temperature range, detection of a current measurement outside of an acceptable current range, water or moisture ingress detection, or other fault condition, many of which are known in the art. The safety switch 6 may also be user-controllable, such as by a physical control means on the housing of the LI battery system 2. For example, a button or switch may be configured on the housing to control opening and closing of the safety switch 6 within the battery system circuit.

When the safety switch 6 is in the open position, charge current from the battery charger 19 cannot be delivered to the cell pack 4. The disclosed LI battery system 2 includes the cell recovery charger 8 positioned along the current flow path between the charger connection 12a and the battery pack 4 when the safety switch 6 is in the open position. The cell recovery charger 8 is configured to deliver a reduced charge current that is less than the charge current delivered by the battery charger 19 during normal charging operations. For example, the cell recovery charger 8 may be configured to deliver 1 amp of charge current.

The BMS 10 is configured to be powered by the cell pack 4 when the available cell pack voltage is sufficient. When the cell pack voltage is insufficient, such as below a threshold voltage, then the BMS is configured to be powered by the external battery charger 19 connected to the battery system 2. The BMS 10 is configured to detect connection of the external charger 19, such as by a voltage sensor configured to sense or measure the pole voltage at point 14. If the safety switch 6 is in the open position, as shown, and the voltage of the cell pack is too low to power the BMS, then current from the battery charger 19 is delivered to the BMS 10 along a circuit path through diode D3. When the voltage of the cell pack is sufficiently high to power the BMS and a battery charger is not connected, then the BMS will be powered from the cell pack via the path through D4. The BMS 10 thus may be powered by current provided along either of the two circuit paths through diodes D3 or D4, which connect at point 16. In one embodiment, the diodes D3 and D4 are the same size and the circuit is configured such that when the voltage of the cell pack is sufficiently high to power the BMS, a battery charger is connected, and the switch 6 closed, then the BMS will be powered through both diodes D3 and D4, as the voltage of the battery charger will equal the voltage of the cell pack.

FIG. 2 depicts another embodiment of an LI battery system 2. The cell recovery charger 8 and the BMS 10 are integrated on a single printed circuit board (PCB) 40. The BMS 10 includes a central controller 30 communicatively connected to the cell recovery charger 8 and configured to control operation thereof. The controller 30 includes, for example, a central processing unit (CPU) and may also include other logic devices communicatively connected to the CPU and operable therewith to monitor and control the battery system 2.

The cell recovery charger 8 may be, for example, a current and voltage limited buck converter or other step down converter configured to provide a predetermined current, such as 1 A, and voltage.

The controller 30 is configured to receive a pole voltage measured at or near the charger connection 12a and to detect when the external battery charger 19 is connected thereto. The controller 30 is further configured to receive voltage measurements from a plurality of cell voltage sensors 25 and to receive temperature measurements from a plurality of temperature sensors 22. The cell voltage sensors 25 may be configured to measure a voltage across each battery cell 5 in the cell pack 4, and thus the voltage of each cell 5 can be monitored.

A plurality of temperature sensors 22 are positioned across the cell pack 4 to measure temperature at various points within the cell pack. For example, temperature sensors may be positioned to measure the temperature at each battery cell, or at every second or third battery cell, to provide a few examples. Additional temperature sensors may be placed at other locations within the housing of LI battery system 2, and such measurements may also be received at the controller 30.

A current sensor 24 is positioned to measure a current through the cell pack 4. Depending on the sensor configurations, the measurement output of the sensor may be provided to the controller 30 through an analog front end (AFE) 31 which may digitize the analog output where the output of the sensor(s) is an analog signal. In the depicted embodiment, the current sensor 24 output is provided to the CPU through the AFE 31, and likewise the output of the voltage sensors 25 is provided to the controller 30 through the AFE 31.

The BMS 10 may include a cell balancing system comprising a plurality of cell balancers 28 controllable to balance the cell voltages of the plurality of battery cells 5. The BMS 10 may be configured to inhibit balancing by the cell balancers 28 during at least certain portions of the recovery process to isolate and test each battery cell 5. The BMS 10 may include a balancing inhibit switch 34 openable to inhibit power and/or command delivery to the cell balancers 28, wherein the switch 34 is controlled by the controller 30 via balance inhibit control connection 36.

The controller 30 may also be configured to control the safety switch 6, such as to open the switch 6 to isolate the cell pack 4 when a fault condition is detected—e.g., based on measured temperature, voltage, current, water/moisture levels, etc. within the battery system housing. In FIG. 2, the switch 6 is controllable by the controller 30 via safety switch control connection 38 configured to send open and close commands to effectuate opening and closing actions, respectively, of the switch 6. The switch 6 may also be controllable by a user, such as by an interface on the housing of the battery system 2.

FIG. 2 is coded with dashed lines to illustrate current flow paths when the switch 6 is open and thus the cell recovery process is taking place. The current flow path from the charge connection point 12a to the battery cell pack 4 through the cell recovery charger 8 is highlighted in dotted lines. The current flow path to the BMS 10, which is through diode D3 and point 16 to power supply 39, is illustrated by the bold dashed line. The shared part of the path is shown in dash-dot lines.

Figure 3:
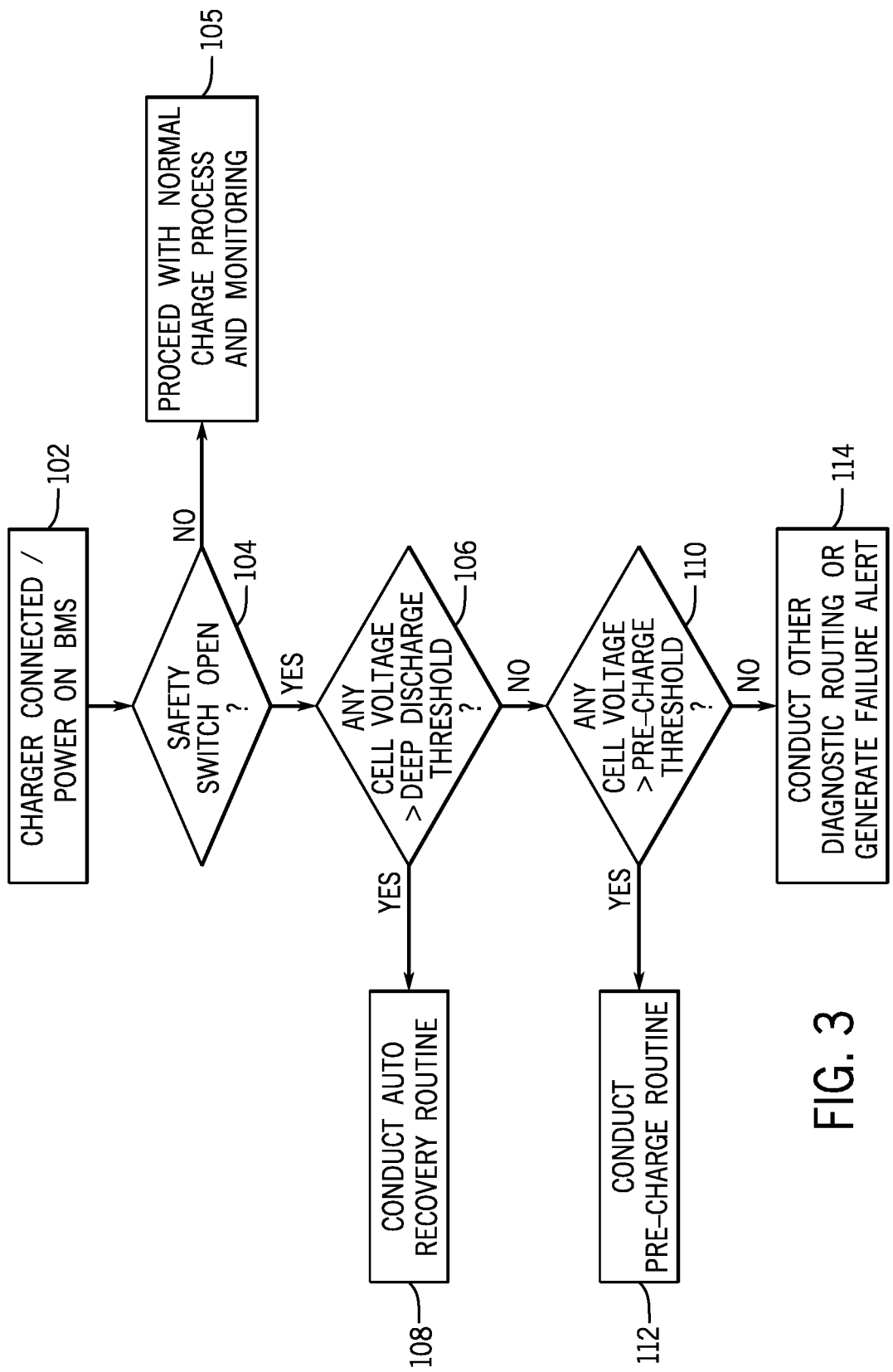
FIGS. 3-6 are flowcharts demonstrating exemplary automatic recovery algorithms, or portions thereof, executable by an LI battery system according to embodiments of the present disclosure.

FIGS. 3-6 are flow charts demonstrating exemplary automatic recovery algorithms, or portions thereof, executed within the LI battery system 2, such as may be managed by the BMS 10. In FIG. 3, a standard external battery charger 19 is connected to the LI battery system 2 and the BMS 10 is powered on at step 102. Step 104 is executed to determine whether the safety switch 6 is in the open position. If not, then a normal charge process and battery system monitoring/diagnostics is executed at step 105. If any battery cells 5 have less than the pre-charge threshold of charge, a low voltage state will be detected and the safety switch opened.

Assuming the safety switch is opened at step 104, steps are executed to determine whether deep discharge has occurred or whether any cell voltage is sufficiently low (e.g., below a pre-charge threshold) justifying operation of the cell recovery charger 8 to deliver the reduced charge current. For example, cell voltages of each battery cell 5 may be measured by the BMS 10, such as by voltage sensors 25. If any cell voltage is below a deep discharge threshold at step 106, then an automatic recovery routine is engaged at step 108 in order to bring the cell voltages to their SOA and test for capacity retention. For example, the deep discharge threshold may be 1.5V. In other embodiments, the deep discharge threshold may be higher or lower than 1.5V, such as depending on the capacity of the battery cells 5 and/or the chemical composition/type of battery cells 5.

If the cell voltages are greater than the deep discharge threshold, then step 110 is executed to determine whether any cell voltage is less than the pre-charge threshold. To provide one example, the pre-charge threshold may be 2.5 V; however, in other embodiments, the pre-charge threshold may be greater than or less than 2.5 V depending on the cell 5 capacity and makeup. The exemplary 1.5 V deep discharge threshold and 2.5 V pre-charge threshold may be appropriate, for example, for an LI battery system 2 comprised of 50 Ah lithium iron phosphate battery cells 5.

If any cell voltage is below the pre-charge threshold at step 110, and thus the one or more cell voltages are between the deep discharge threshold and the pre-charge threshold, then a pre-charge routine is executed at step 112. If, on the other hand, all of cell voltages are greater than the pre-charge threshold at step 110, then the cell recovery charger is not needed and other diagnostic routines and/or failure alerts are conducted at step 114 based on the origin of the error that caused the safety switch to open.

Figure 4:
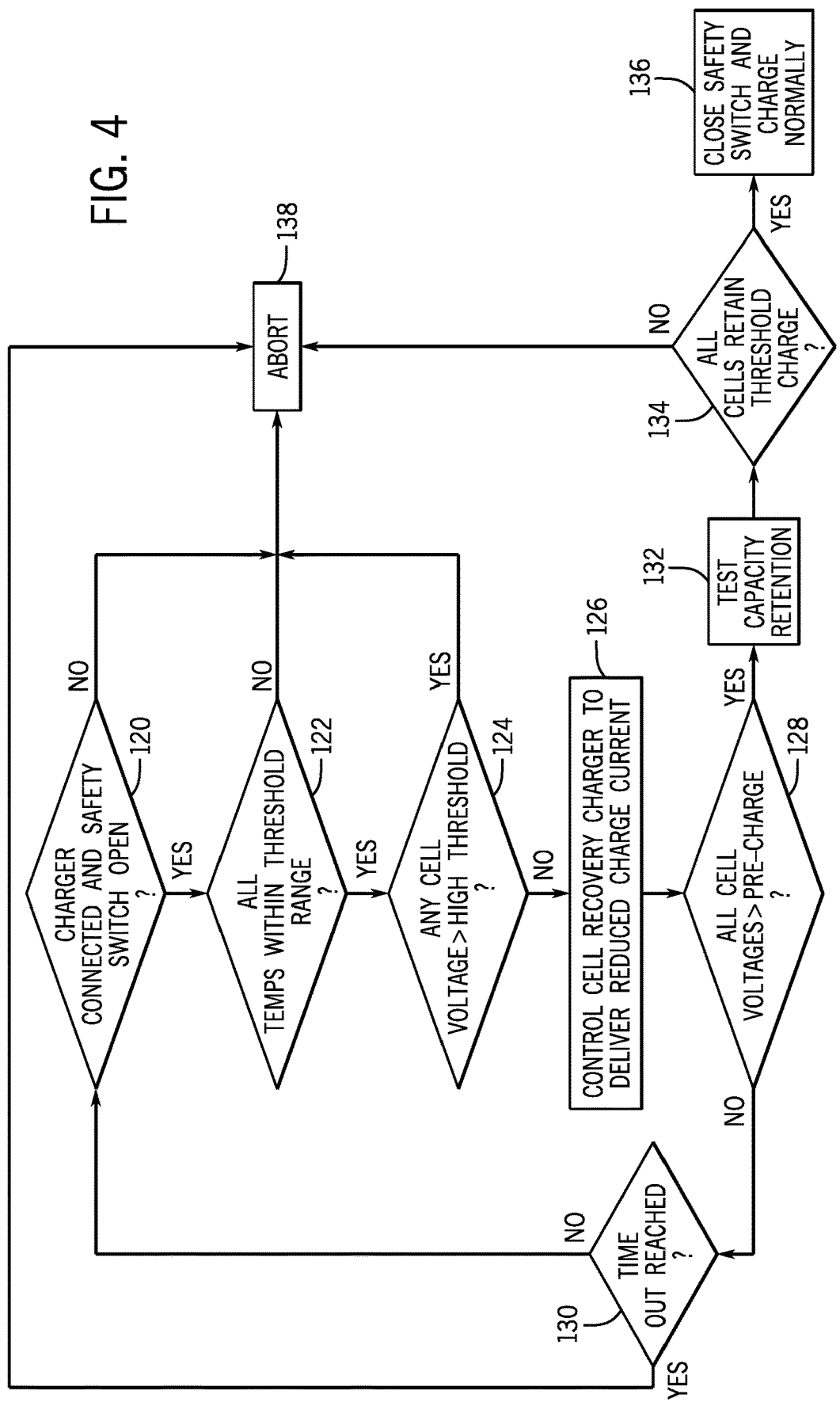

FIG. 4 represents exemplary steps conducted for the automatic recovery routine executed when the deep discharge condition is detected. Step 120 is executed to verify that the external charger 19 remains connected to the battery system 2, such as by detection of a threshold pole voltage as described above, and that the safety switch 6 remains in the open position. If either of those conditions are not true, then the recovery routine is aborted, represented at step 138.

Step 122 is executed to determine whether all temperatures remain within a threshold temperature range. For example, the temperatures assessed at step 122 may be temperature measurements from temperature sensors 22 on or within the battery cell pack 4. The threshold temperature range may be set, for example, to verify that the cell temperatures and general temperature environment of the LI battery system 2 is within a temperate and optimal temperature range for conducting the recovery routine. For example, the temperature threshold range for the recovery routine may be, for example, between 5° C. and 40° C. To provide another example, the temperature threshold range may be between 0° C. and 45° C. In still other embodiments, each of the high and low temperature thresholds for the temperature threshold range may be greater than or less than those examples provided and may be calibrated depending on the type of battery, battery configuration, battery chemistry, battery size, and/or other factors. If any temperature falls outside of the threshold range at step 122, then the recovery routine is aborted at step 138.

Step 124 is executed to determine whether any cell voltage exceeds a high voltage threshold. The high cell voltage threshold is greater than the pre-charge threshold. For example, the high voltage threshold may be 3.65V. In other embodiments, the high voltage threshold may be greater than or less than 3.65V, depending on cell capacity and cell composition, for example. If any cell exceeds the high voltage threshold at step 124, then a compromised or failed cell is likely and the recovery routine is aborted at step 138. Alternatively, each cell voltage may be compared to an average or median of all the cell voltages to identify whether any cell has an abnormally high voltage compared to the others, which would indicate a bad cell, and the abort could be triggered accordingly.

Assuming all cell voltages remain less than the high voltage threshold, the temperatures remain within the temperature threshold range, the charger remains connected, and the switch remains open, then step 126 is executed to deliver the reduced charge current by the cell recovery charger 8. In the first instance, this will start the recovery charge process and a timer is started at step 130. The charger connectivity, safety switch state, cell temperatures, and cell voltages are continually monitored while the reduced charge current is delivered by the cell recovery charger 8. The reduced charge current is delivered until the cell voltages reach the pre-charge threshold or some other threshold that is greater than or equal to the pre-charge threshold, step 128. For example, where the pre-charge threshold is 2.5V, the threshold executed at step 128 may be, for instance, 2.6V.

The reduced charge current delivery is continued until either the pre-charge threshold is reached at all battery cells or the timeout threshold is reached at step 130. The predetermined maximum time (step 130) may be calibrated based on the battery capacity of the LI battery system 2. To provide one example, for a 24V battery system 2 the timeout threshold could be, for instance, three hours. For a 12V battery system 2, the timeout threshold may be, for instance, six hours. In other examples, the timeout thresholds may vary from the examples provided. If the timeout threshold is reached without all cell voltages reaching the pre-charge threshold, then it is determined that at least one of the cells cannot hold charge capacity and that the cell pack 4 is thus compromised. The cell recovery routine is thus aborted at step 138.

In certain embodiments, the BMS 10 may be configured to re-execute the recovery routine again after aborting, such as to initiate a counter and execute a predetermined maximum number of retries to complete the recovery. Alternatively or additionally, the BMS 10 may be configured to generate an error when the recovery routine is aborted and/or after the predetermined number of retries.

Once all cell voltages have reached at least the pre-charge threshold at step 128, then the reduced charge current delivery is stopped and the battery capacity retention is tested, represented at step 132. In various embodiments, a load may be applied to the cells 5 in the cell pack 4, such as for a predetermined time and/or a relaxation period executed where no charge current or load is applied to the cells. If all cells retain at least a threshold charge, represented at step 134, then the cells are deemed good.

The threshold charge implemented at step 134 may be at or below the pre-charge threshold. For example, where the pre-charge threshold is 2.5V, the threshold charge may be, for example, 2V. If all cells do not maintain at least the threshold charge at step 134, then the battery pack 4 is determined to be compromised and the recovery routine is aborted at step 138. If all cells do retain the threshold charge throughout the capacity retention testing routine, then the battery cell pack 4 is deemed to be "recovered" and can be charged normally. Thus, the safety switch 6 is closed at step 136, such as by an automatic close routine executed by the BMS 10 (and effectuated via safety switch control connection 38), and then the battery system 2 can be charged normally by the battery charger 19.

Figure 5:
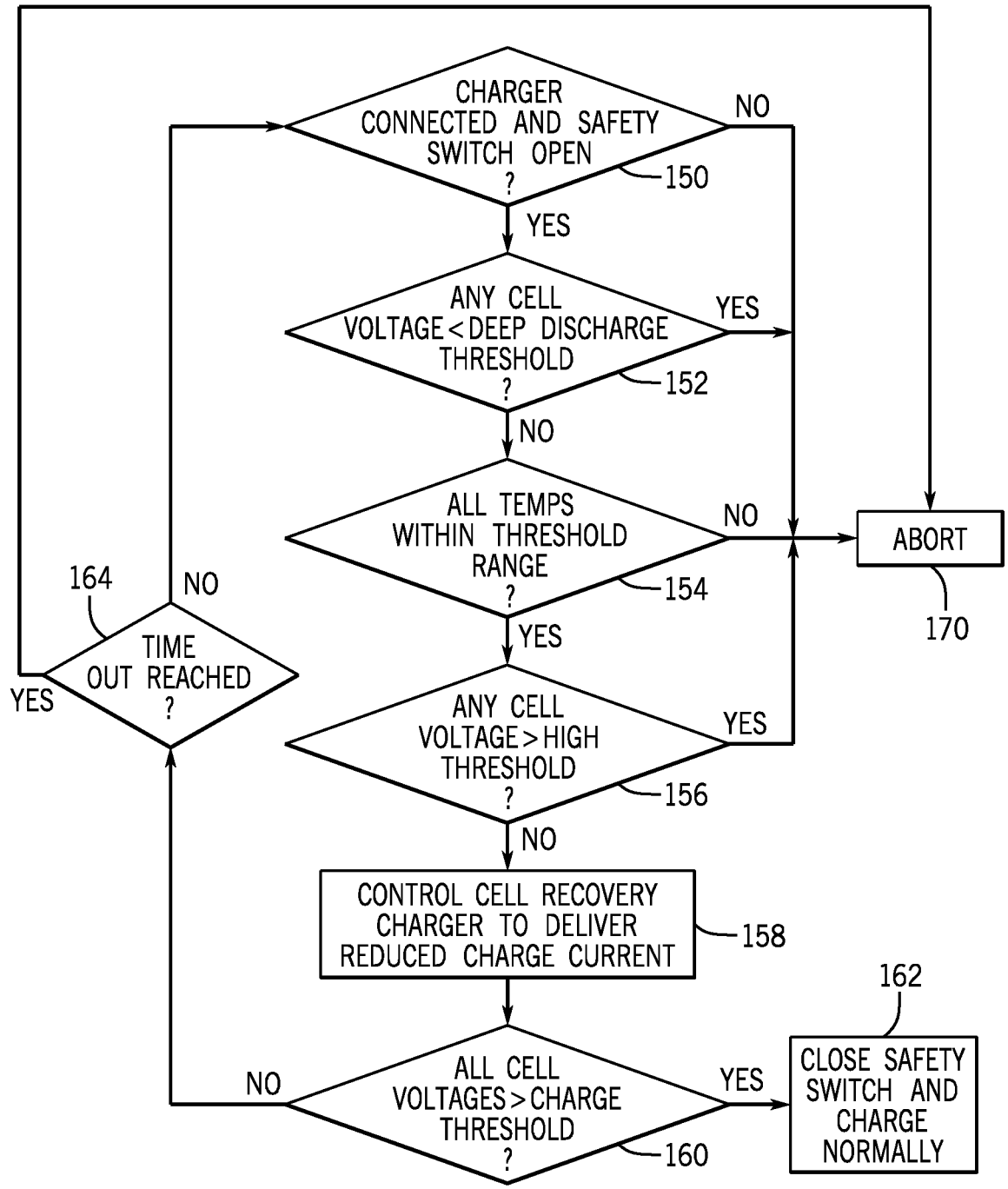

FIG. 5 represents an exemplary pre-charge process executed where all cell voltages are greater than the deep discharge threshold, but at least one cell voltage is less than the pre-charge threshold, as explained at FIG. 3. Verification steps are executed at step 150 to determine that the battery charger 19 remains connected to battery system 2 and that the safety switch 6 remains in the open position. If either of those become untrue, then the pre-charge routine is aborted at step 170.

If any cell voltage becomes less than the deep discharge threshold at step 152, then the pre-charge routine is aborted at step 170. Alternatively, each cell voltage may be compared to an average or median of all the cell voltages to identify whether any cell has an abnormally low voltage compared to the others, which would indicate a bad cell, and the abort could be triggered accordingly.

The temperature measurements from the various temperature sensors, including the temperature sensors 22 within the cell pack 4, are assessed at step 154 to determine whether all temperature measurements remain with the threshold range. The threshold range utilized for the pre-charge routine may be different than the temperature threshold range utilized for the recovery routine. For example, the temperature range utilized for the pre-charge routine may be a wider range having a lesser minimum threshold and/or a greater maximum temperature threshold than threshold range utilized for the recovery routine. For instance, the temperature range utilized for the pre-charge routine may be, for example, a temperature range between 0° C. and 45° C. In other embodiments, the minimum or maximum temperatures for the range may be lesser or greater than the example. If any temperature measurement outside of the threshold range at step 154, then the pre-charge routine is aborted at step 170.

Cell voltage measurements are assessed at step 156 to determine whether any battery cell 5 voltage is greater than a high cell voltage threshold. For example, the high cell voltage threshold may be 3.65V, which may be the same as or different than the voltage threshold utilized for the recovery routine. Alternatively, each cell voltage may be compared to an average or median of all the cell voltages to identify whether any cell has an abnormally high voltage compared to the others, which would indicate a bad cell, and the abort could be triggered accordingly.

Assuming that the cell voltages remain within the threshold range and the temperatures also remain within the given threshold, and also provided that the external charger 19 remains connected and the safety switch 6 open, then the reduced charge current is delivered to the cell pack 4 by the cell recovery charger 8, represented at step 158. In the first instance when reduced charge current is initiated, a timer is started.

The cell voltages are continually monitored throughout the recharge process to assess whether all cell voltages have reached the charge threshold at step 160. A voltage threshold that is greater than or equal to the pre-charge threshold may be utilized here, such as a voltage threshold that is slightly above or well above the pre-charge threshold. For example, the charge threshold utilized at step 160 may be, for instance, 3.2V.

The reduced charge current is continually delivered while the cell voltages and temperatures are monitored until all cell voltages reach the voltage threshold or a timeout threshold is reached at step 164, whichever is first. Once all cell voltages reach the charge threshold, then the battery is deemed "recovered" and the safety switch 6 can be closed at step 162 to resume normal charging from the battery charger 19. In certain examples, the capacity retention testing steps exemplified for the recovery routine may also be executed as part of the pre-charge routine. If the charge threshold is not reached within the timeout threshold, then the pre-charge routine is aborted at step 170. In certain embodiments, the BMS 10 may be configured to re-execute the pre-charge routine again, or for a predetermined number of times, and/or may be configured to generate an error when the pre-charge routine is aborted.

Figure 6:
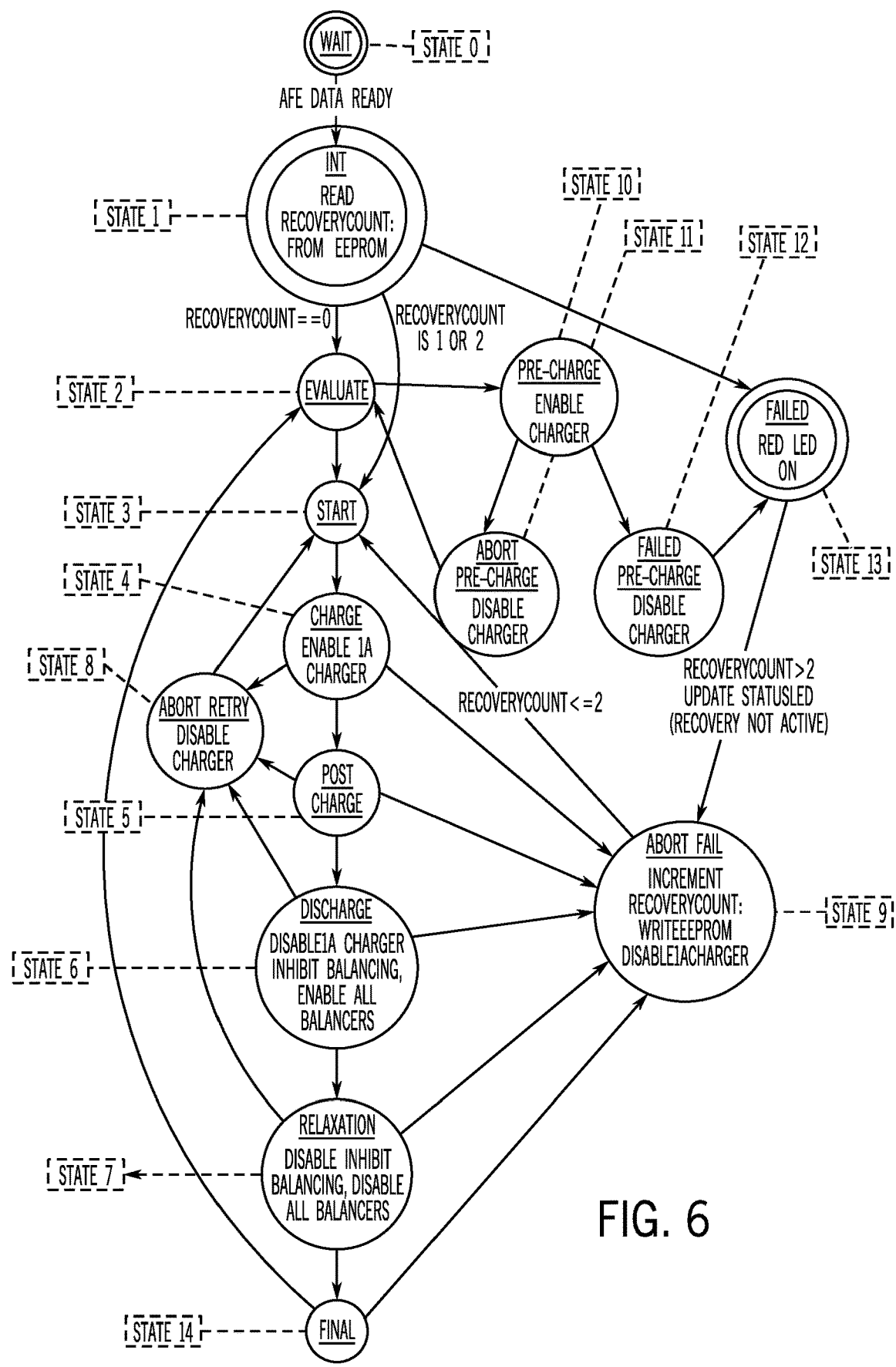

FIG. 6 is a flowchart exemplifying another embodiment of a method of implementing a cell recovery. The assessment for activation of the recovery process is initiated at State 1. At the "evaluation" state, State 2, if any cell voltage is less than 1.5V, a "recovery active" status or a status indicating deep discharge detection is updated in EEPROM, the recovery count variable is set to one, and the logic proceeds to State 3.

Alternatively, if at State 2 all cell voltages are greater than 1.5V but less than 3.2V and at least one cell voltage is below 2.5V, then the "pre-charge" process is initiated, State 10 and the yellow LED 42 on the battery housing is illuminated (FIG. 2), provided that the cell temperature measurements are within the threshold range of 5° C. to 40° C., the switch 6 is open, the charger is connected, the recovery count is zero, and the automatic close function for controlling the switch 6 is enabled. If any of those conditions are not true, or if any cell voltage exceeds 3.65V, then the pre-charge process is aborted, State 11, and then retried once more starting at State 2. If the battery voltage reading exceeds the rating for the battery or if a BMS failure is detected, then the logic enters State 12 where a pre-charge failure alert is generated (State 13) by illuminating the red LED 41 on the battery housing.

Assuming State 3, the battery conditions are monitored. Provided that the cell temperature measurements are within the threshold range of 5° C. to 40° C., the switch 6 is open, the charger is connected, the recovery count is equal to one, and the automatic close function for controlling the switch 6 is enabled, then the logic proceeds to State 4 where 1A charge delivery from the cell recovery charger 8 is delivered.

If the external battery charger 19 gets disconnected, the switch 6 gets closed, or any cell temperate is outside the temperature range, then the logic proceeds to State 8 where the recovery process returned to State 3 for a retry. If any cell voltage exceeds 3.65V or the time out period is reached, then the logic proceeds to State 9 where the recovery process is aborted, the recovery count is incremented, and the cell recovery charger 8 is disabled.

If all cell voltages reach at least 2.5 volts prior to the time out period being reached, then the logic proceeds to State 5, the "post charge" state where the voltage is monitored for a predetermined period. If any voltage exceeds 3.65V or a BMS failure is detected then the logic proceeds to State 9 described above, otherwise the logic proceeds to State 6.

The capacity retention of the cells is then tested. Balancing is inhibited, such as by opening the balancing inhibit switch 34 (FIG. 2), and the individual balancers are then utilized as a small load on each of the battery cells 5. If the switch 6 gets closed or the cell temperature is outside of the temperature range, then the logic proceeds to State 8 described above. If any cell voltage falls below 2V or a BMS failure is detected, then the logic proceeds to State 9 described above.

Provided that all cells hold at least the threshold charge of 2V for the time out period, then the logic proceeds to State 7, the "relaxation" state, where the cells sit for a predetermined time of two hours. The balancing remains inhibited and all balancers are disabled to remove the load on the cells. If the switch 6 gets closed or the cell temperature is outside of the temperature range, then the logic proceeds to State 8 described above. If any cell voltage falls below 2V or a BMS failure is detected, then the logic proceeds to State 9 described above.

The logic then proceeds to State 14 where the recovery process is completed. Provided that all cell voltages are greater than 2.5V and no BMS failure is detected, then the recovery count is set to zero, the status is set to indicate that the recovery is not active, and the logic returns to the evaluation State 2. The green LED 43 on the battery housing is illuminated to indicate that the battery recovery was successful and the battery is ready for normal operation.

In one exemplary embodiment, a rechargeable lithium-ion battery system includes a cell pack comprising a plurality of battery cells, a charger connection configured to connect to a battery charger to supply a charge current, a safety switch positioned between the cell pack and the charger connection. The safety switch positioned is operable to divert charge current from the battery charger through the cell recovery charger to the cell pack. The cell recovery charger is configured to deliver a reduced charge current to the cell pack when the safety switch is operating to divert the charge current, wherein the reduced charge current is less than the charge current supplied by the charger.

For example, the safety switch may be configured such that when the safety switch is open it prevents delivery of the charge current from the battery charger directly to the cell pack and diverts it through the cell recovery charger instead. The system may further include a battery management system configured to be powered by either of both the battery charger connected to the charger connection and by the cell pack, one at a time. For example, the battery management system may be configured to be powered by the battery charger connected to the charger connection when the safety switch is open, or otherwise operating to divert the charge current through the cell recovery charger, and to be powered by the cell pack when the safety switch is closed, or otherwise not operating to divert the charge current.

The cell recovery charger may be configured to deliver the reduced charge current to the cell pack only when a temperature measurement is within a threshold temperature range, all cell voltages remain below a high threshold, and the safety switch remains open.

The system may be configured to initiate delivery of the reduced charge current from the cell recovery charger to the cell pack only when a cell voltage of any one of the plurality of battery cells is less than a first threshold cell voltage. To provide just one example, where the battery system comprises 50 Ah lithium iron phosphate battery cells the first threshold cell voltage may be 2.5 V.

The system may be configured such that the cell recovery charger continues delivery of the reduced charge current to the cell pack until the cell voltage of each of the plurality of battery cells is greater than the first threshold voltage. The system may be configured to stop delivery of the reduced charge current from the cell recovery charger once the cell voltage of each of the plurality of battery cells is greater than the first threshold voltage and then to test whether each cell can hold a charge by applying a load to each individual cell. For instance, the system may be further configured to apply the load to the cell pack for a predetermined period and to determine that the cell pack is compromised if the cell voltage of any of the plurality of battery cells is less than a third threshold cell voltage, wherein the third threshold cell voltage is less than the first threshold cell voltage. Alternatively or additionally, the system may be further configured to determine that the cell pack is compromised if the cell voltage of any of the plurality of battery cells is less than a fourth threshold cell voltage after a predetermined relaxation time where no load and no charge voltage is applied to the cell pack, wherein the fourth threshold cell voltage is less than or equal to the first threshold cell voltage. In certain further examples, the system may be configured such that the cell recovery charger only delivers the reduced charge current to the cell pack when the cell voltage of each of the plurality of battery cells is less than a second threshold cell voltage, wherein the second threshold cell voltage is greater than the first threshold cell voltage. Referring to the same 50 Ah lithium iron phosphate battery cell example to illustrate, where the first threshold voltage is 2.5 V the second threshold may be 3.65 V, the third threshold may be 2.0 V, and the fourth threshold may be 2.5 V or slightly less.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A rechargeable lithium-ion battery system comprising:
   a cell pack comprising a plurality of battery cells;
   a charger connection configured to connect to an external battery charger to supply a first charge current to recharge the plurality of battery cells;
   a safety switch positioned between the cell pack and the charger connection and operable to divert the first charge current from the external battery charger through a cell recovery charger to the cell pack; and
   wherein the cell recovery charger is operated to deliver a charge current to the cell pack to charge the plurality of battery cells until a cell voltage of each of the plurality of battery cells is greater than a threshold cell voltage or until a time out period is reached.

2. The system of claim 1, wherein the charge current delivered by the cell recovery charger to the cell pack is a reduced charge current that is less than the first charge current supplied by the external battery charger.

3. The system of claim 1, wherein the safety switch is operable to stop diverting the first charge current through the cell recovery charger and to enable delivery of the first charge current directly to the cell pack once the cell voltage of each of the plurality of battery cells reaches a charge threshold.

4. The system of claim 1, further comprising a battery management system configured to, upon the cell voltage of each of the plurality of battery cells being greater than the threshold cell voltage, test whether each of the plurality of battery cells can hold a charge by applying a load to each of the plurality of battery cells, individually, prior to operating the safety switch to stop diverting the first charge current through the cell recovery charger.

5. The system of claim 4, further comprising cell balancers connecting between sets of battery cells in the plurality of battery cells, wherein the load is applied using the cell balancers.

6. The system of claim 4, wherein the battery management system is further configured to apply the load to each of the plurality of battery cells in the cell pack for a predetermined period and to determine that the cell pack is compromised based on the cell voltage of the plurality of battery cells is less than a third threshold cell voltage, wherein the third threshold cell voltage is less than the threshold cell voltage.

7. The system of claim 4, wherein the system is further configured to determine that the cell pack is compromised if the cell voltage of any of the plurality of battery cells is less than a fourth threshold cell voltage after a predetermined relaxation time where no load and no charge voltage is applied to the cell pack, wherein the fourth threshold cell voltage is less than or equal to the threshold cell voltage.

8. The system of claim 1, further comprising a battery management system configured to determine the cell voltage of any one of the plurality of battery cells in the cell pack is less than a first threshold cell voltage prior to operating the safety switch to divert the first charge current through the cell recovery charger.

9. The system of claim 8, wherein the first threshold cell voltage is less than the threshold cell voltage for ceasing diversion of the first charge current from the external battery charger through the cell recovery charger.

10. The system of claim 1, further comprising a battery management system configured to be alternately powered by either the external battery charger connected to the charger connection or the cell pack, wherein the battery management system is configured to be powered by the external battery charger connected to the charger connection when the safety switch is operating to divert the first charge current through the cell recovery charger, and to be powered by the cell pack when the safety switch is not operating to divert the first charge current through the cell recovery charger.

11. The system of claim 1, further comprising a battery management system configured to operate the cell recovery charger to deliver the charge current to the cell pack only when a temperature measurement within the cell pack is within a threshold temperature range.

12. A method for controlling charging of a rechargeable lithium-ion battery system that includes a cell recovery charger and safety switch positioned between a cell pack and a charger connection to an external battery charger supplying a first charge current to recharge a plurality of battery cells in the cell pack, the method comprising:
  monitoring a cell voltage of the plurality of battery cells in the cell pack;
  operating the safety switch to prevent direct delivery of the first charge current to the cell pack and to divert the first charge current to the cell recovery charger; and
  operate the cell recovery charger to deliver a reduced charge current to the cell pack and to a battery management system (BMS) of the rechargeable lithium-ion battery system until the cell voltage of each of the plurality of battery cells is greater than a threshold cell voltage or a time out period is reached.

13. The method of claim 12, wherein the reduced charge current is less than the first charge current supplied by the external battery charger.

14. The method of claim 12, further comprising, as a precondition to operating the safety switch to divert the first charge current to the cell recovery charger, detecting that the cell voltage of any one of the plurality of battery cells in the cell pack is less than a first threshold cell voltage.

15. The method of claim 14, wherein the first threshold cell voltage is less than the threshold cell voltage for ceasing diversion of the first charge current from the external battery charger through the cell recovery charger.

16. The method of claim 14, wherein the first threshold cell voltage is a deep discharge threshold indicating that the one of the plurality of battery cells is deeply discharged, and the threshold cell voltage is a pre-charge threshold that is greater that the deep discharge threshold.

17. The method of claim 12, further comprising operating the safety switch to stop diverting the first charge current through the cell recovery charger and to enable delivery of the first charge current directly to the cell pack once the cell voltage of each of the plurality of battery cells reaches a charge threshold.

18. The method of claim 12, monitoring a temperature of at least one location within the cell pack and operating the cell recovery charger to deliver the reduced charge current to the cell pack only when a temperature measurement is within a threshold temperature range.

19. The method of claim 12, further comprising operating the cell recovery charger to deliver the reduced charge current to the cell pack only when the cell voltage of any one of the plurality of battery cells is less than a high voltage threshold;
  determining that the cell pack is compromised if the cell voltage exceeds the high voltage threshold and generating a failure alert.

20. The method of claim 19, wherein automatically testing whether each cell can hold a charge includes operating a battery management system to apply a load to each of the plurality of battery cells for a predetermined period and to determine whether the cell pack is compromised based the cell voltages of the plurality of battery cells.

* * * * *